May 24, 1949.　　　　P. K. SAUNDERS　　　　2,471,081
HOSE

Filed April 13, 1945　　　　　　　　　　　　3 Sheets-Sheet 1

INVENTOR
Philip K. Saunders
BY
Pennie Davis Marvin Edwards
ATTORNEYS

May 24, 1949.　　　　P. K. SAUNDERS　　　　2,471,081
HOSE
Filed April 13, 1945.　　　　　　　　　　　3 Sheets-Sheet 2
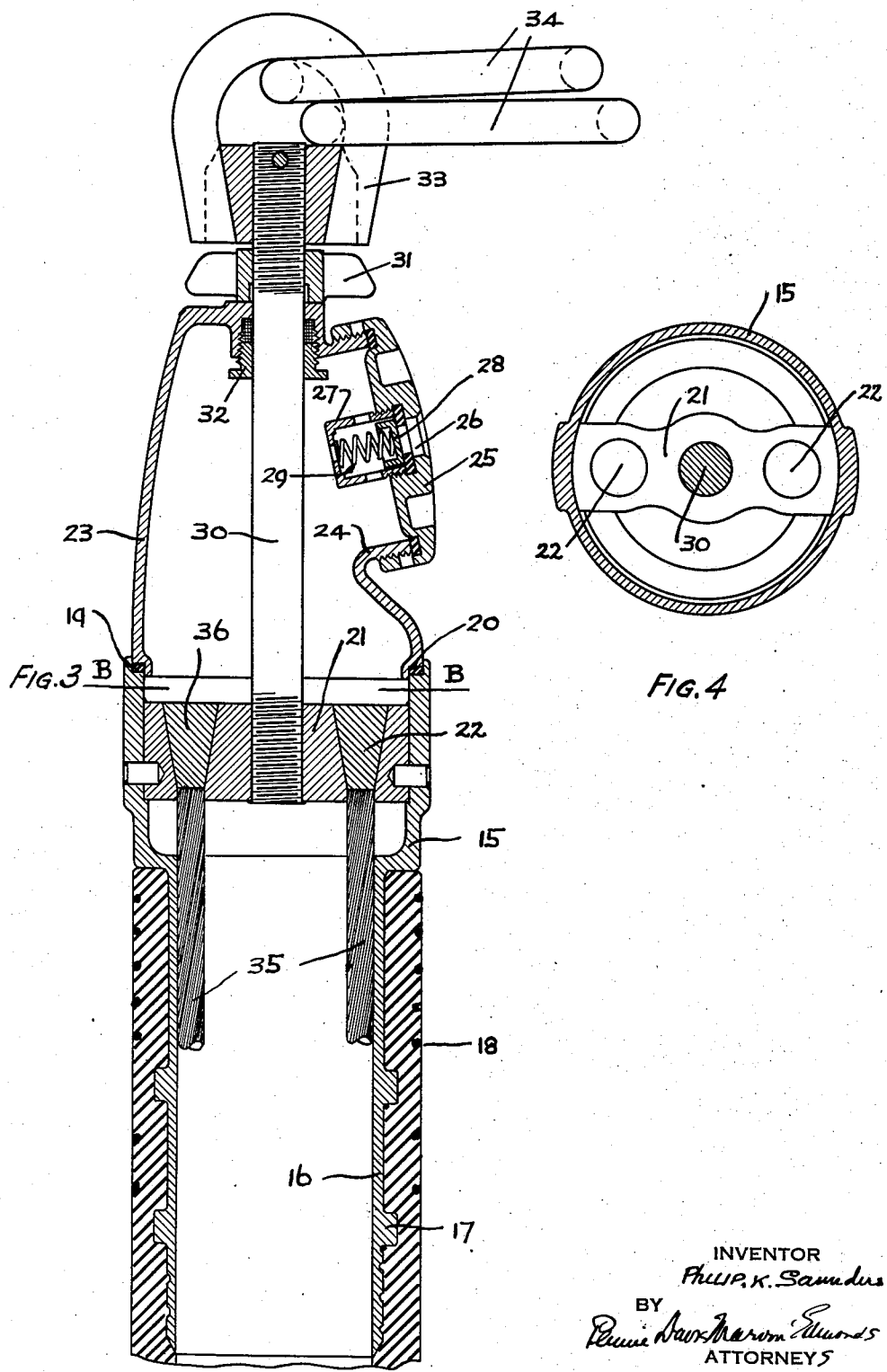

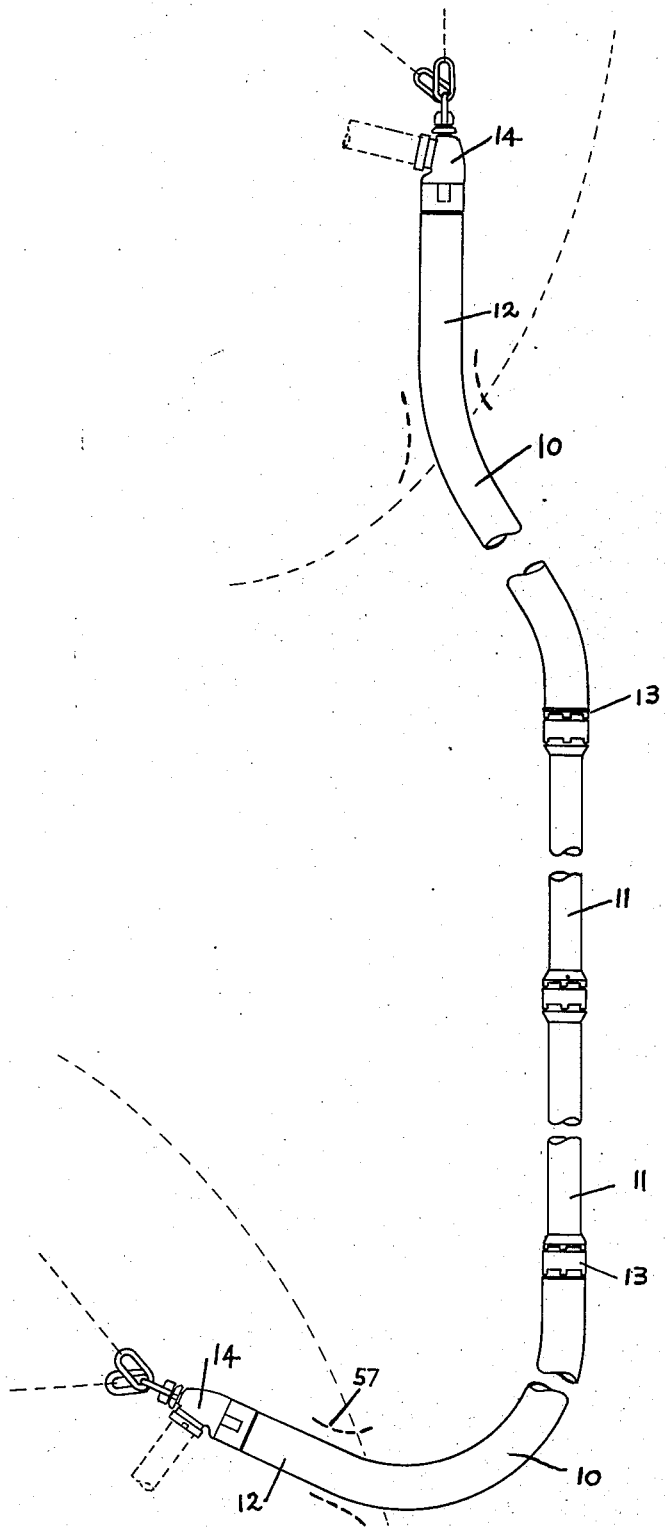

Patented May 24, 1949

2,471,081

UNITED STATES PATENT OFFICE 2,471,081

HOSE

Philip K. Saunders, Mamaroneck, N. Y.

Application April 13, 1945, Serial No. 588,084

22 Claims. (Cl. 138—60)

This invention relates to hose for transferring fluids and is concerned more particularly with a novel hose for that purpose which is provided with reinforcing means giving it a tensile strength greatly in excess of that provided by the fabric within the hose wall. Despite its increased tensile strength, the new hose is sufficiently light in weight, so that when inflated with air, it will float and the hose may, accordingly, be advantageously employed for passing oil fuel and other liquid supplies from one ship to another while each is proceeding on its course. An embodiment of the invention suitable for that use will be illustrated and described for purposes of explanation, but it will be apparent that the utility of the new hose is not limited to that particular application.

At the present time, it is common practice to refuel an escort vessel from a tanker while both are in motion and, in this operation, a flexible rubber hose has been employed. When not in use, the hose is stored on the deck of the tanker and when a transfer of fuel is to be made, both ends of the hose are closed, and the hose is inflated through a suitable air valve. After inflation of the hose, a messenger cable is attached to its outboard end and the cable with floats attached is put overboard and the hose is payed out. The escort vessel picks up the wire and draws in the wire and the floating hose, after which the end of the hose is made fast and the air is released. The hose is then connected to the pumping equipment on the tanker and to the bunkers of the escort vessel and the pumping of the fuel begins. When the desired delivery has been made, the hose connections are broken, the hose is closed and inflated, and the hose and messenger wire are released from the escort vessel. The hose and wire are then drawn inboard of the tanker and the hose is deflated and stored.

It will be apparent that a hose to be employed in the operations described must have great tensile strength to enable it to withstand the stresses to which it is subjected in use, and, at the same time, it must be light enough to float when inflated. Prior hose used for the purpose have been longitudinally reinforced by means of a cable or jackstay which is lashed and clamped to the outside of the hose. Ordinarily, the hose is made in sections about 50 feet long and at the end of each section, there is a coupling member by which the section may be secured to another. The jackstay of each section is formed with an eye-splice at each end so that the jackstays of adjacent sections may be connected by shackles or other means, and, when two hose sections are to be connected, the coupling members must first be secured together to make a fluid-tight connection and the ends of the jackstays must then be shackled together. The jackstays, clamps, lashings, eye-splices, and shackles all lie on the outside of the hose and it is not only awkward and laborious to assemble the hose sections, but also difficult to handle the hose because of the fouling of obstructions on the ships' decks by the projecting parts on the outside of the hose, when the latter is being taken in or payed out.

The present invention is directed to the provision of a novel hose which, although longitudinally reinforced, has a smooth outer surface, so that it can be readily handled, and this result is obtained by mounting the reinforcing means within the interior of the hose. The reinforcing elements are secured to the couplings at the ends of each hose section and the couplings are made strong enough not only to resist the pressure of the fluid passing through them but also to withstand the pull of the reinforcing elements connected thereto. With the construction described, the connection of the coupling members on adjacent hose sections also serves to connect the reinforcements within the sections, so that the two sections may be secured together in a single operation. Since the reinforcing elements lie within the hose sections, there is no need to lash and clamp the elements in place. The outside of the hose is, accordingly, smooth and free of projecting parts and the hose is lightened by the weight of the lashing, clamps, and shackles.

Each complete hose embodying the invention includes a pair of end sections, each of which has a towing head at one end and a coupling member at the other connected by reinforcing means within the section. The head is made in two parts, one of which is mounted within the end of the hose section and the other mounted in alignment with the first. The two parts of the head are secured together by means including a rod which projects through the outer part and is provided with an eye by which a pull may be transmitted to the inner member of the head and through it to the reinforcing means. The outer member of the head is of generally conical formation and it is formed with an opening closed by a removable cap provided with an air valve. By reason of the conical formation of the outer member of the head, the cap lies within the projected circumference of the hose section and thus does not form a projection that would be caught on an obstruction.

The new hose includes numerous novel features additional to those mentioned and the invention may be better understood by reference to the accompanying drawings, in which Fig. 1 is a view partly in elevation and partly in longitudinal section through the coupling used for connecting a pair of adjacent sections of the new hose;

Fig. 3 is a longitudinal sectional view with parts shown in elevation of the towing head on an end section of the new hose;

Fig. 4 is a sectional view on the line B—B of Fig. 3; and

Fig. 5 is a plan view showing the new hose in use.

Figures 1, 2:
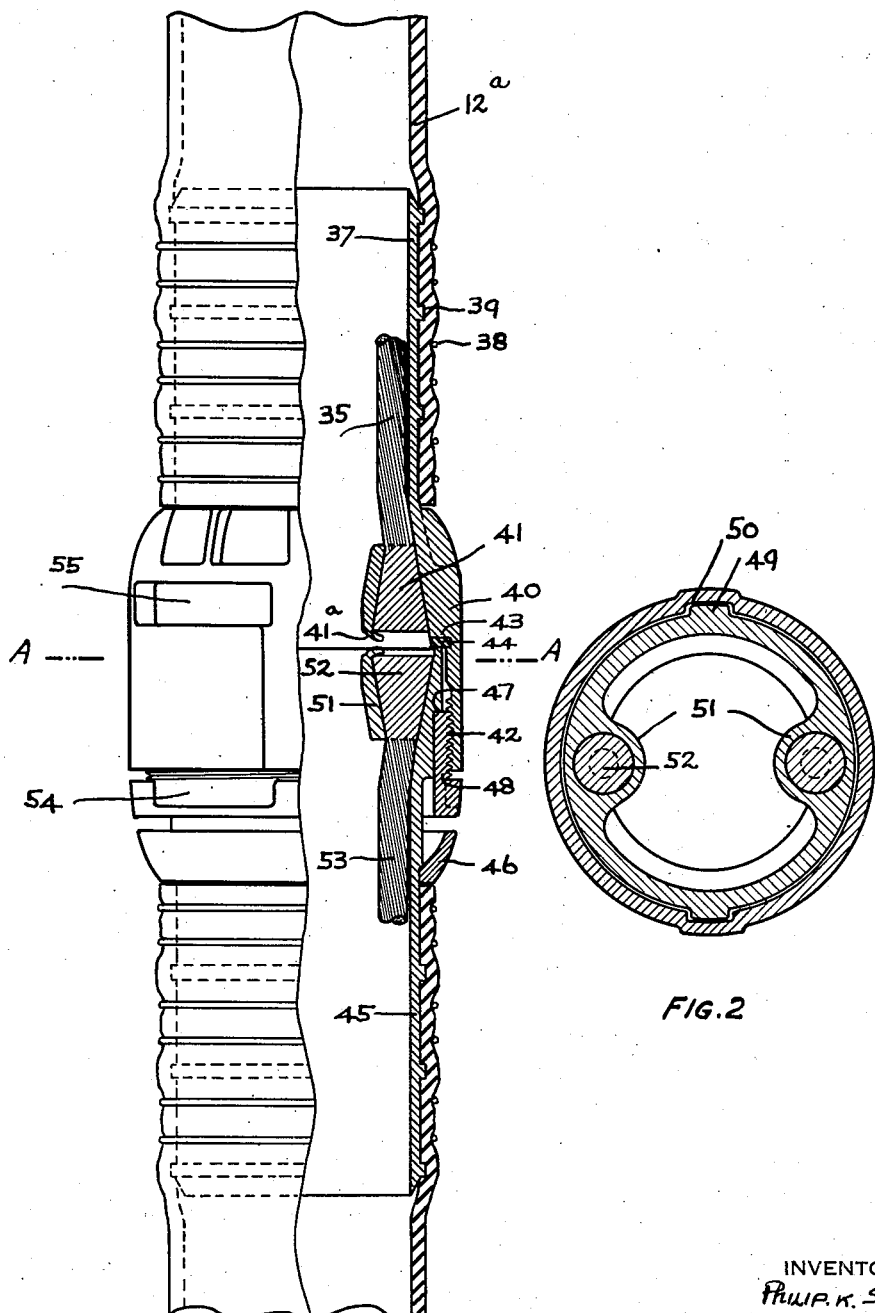
Fig. 2 is a sectional view on the line A—A of Fig. 1.

The complete hose, as shown in Fig. 5, comprises end sections 10 and any desired number of intermediate sections 11. Each end section comprises a length of hose 12 and has a coupling member 13 at one end and a towing head generally indicated at 14, at the other. The hose proper is made of rubber with the usual fabric reinforcement and the hose used in the end sections may be armored by suitable means.

The towing head at the outer end of each end hose section comprises an inner tubular member 15 having an extension 16 which lies within the end of the length of hose. The extension is provided with circumferential flanges 17 or other means which become embedded within the inner wall of the hose so that the latter may be properly secured to the extension by suitable clamping wires 18. The body of the member 15 lying outside the end of the hose is of enlarged diameter and at its forward end, it is formed with a circumferential seat 19 in which is disposed a gasket 20. A bridge piece 21 is mounted within the enlarged portion of member 15 and it is held in place on an internal seat therein by welding or other appropriate means. The bridge piece is formed with conical sockets 22 extending through it and tapering toward the interior of the hose section, the sockets being diametrically disposed.

The towing head also includes an outer member 23 which is of generally conical form and is provided with a neck 24 defining an opening that may be closed by a cap 25. The cap is formed with a central opening 26 leading to a cage 27 within which is mounted an air valve 28 pressed to closed position by a spring 29. The conical outer member 23 is seated upon gasket 20 at the end of the inner member 15 and is held in place by means including a rod 30 which passes through an opening in the outer end of the conical member and is threaded into the bridge member 21. A wing nut 31 is threaded on the exposed end of rod 30 and presses against the end of the conical member 23 to clamp it against gasket 20. A gland 32 encircling rod 30 within the end of outer member 23 prevents leakage around the rod.

A towing eye 33 is threaded on the outer end of the rod 30 and carries a pair of links 34. One of these links is attached to the end of a messenger wire, by which the hose may be drawn aboard the escort vessel to which the oil delivery is to be made, or to a recovery wire wound about the drum of a windlass on the tanker. The other link is used as an additional means for making fast the end of the hose on either the escort vessel or the tanker.

The end hose section is reinforced by a pair of cables 35, which extend from end to end of the section within the interior thereof. The cables are connected to the bridge piece by having their ends passed through the sockets 22 in the member and then expanded and held in that condition by molten metal poured in among the expanded strands and allowed to harden. The enlarged cable ends 36 so formed are securely anchored in the bridge piece against movement into the interior of the hose and a pull applied to the towing eye is transmitted through rod 30 to the bridge piece and thence to the cables.

At its inner end, each end section of the hose is provided with a coupling member, which may be of either male or female form, one end section being provided with a female coupling member and the other with a male coupling member. Each intermediate section 11 of the hose is also provided with coupling members at its ends and has a male member at one end and a female member at the other. The coupling members used on the inner ends of the end hose section and on the ends of the intermediate hose sections are shown in Figs. 1 and 2.

The female member includes a tubular part 37 which is inserted into the end of the hose 12a and held in place therein by clamping wires 38. Circumferential flanges 39 on the outer surface of part 37 become embedded in the inner wall of the hose during the clamping operation and help to secure the coupling member in place. The coupling member has a part 40 projecting out of the end of the hose and of enlarged interior diameter, and a pair of socketed supports 41 are secured to the inner wall of part 40 of the coupling member. The socket in each support tapers toward its inner end and in the sockets are mounted the ends of reinforcing cables 35, these ends having been enlarged in the manner previously described. Each support is provided with a projection 41a which can be bent to overhang the outer end of the cable seated in the support to prevent the end from being outwardly displaced. The supports are arranged diametrically within each coupling member. At its free end, the female coupling member is internally threaded, as indicated at 42, and inward from the threads, the member has a shoulder 43, on which is seated a gasket 44.

The male coupling member employed at one end of each intermediate section and at the inner end of one of the end sections includes a tubular portion 45 which lies within the end of hose section 12a and is secured in place therein in the manner previously described in connection with the female coupling member. At the end of the hose, a conical guard ring 46 is mounted and on the coupling member and outwardly from the guard ring, the member is formed with a circumferential shoulder 47, which may be engaged by the inner end of a tubular nut 48 threaded into the threads 42 within the outer end of the female coupling member. The male coupling member is provided with a pair of external longitudinally extending lugs 49 receivable into corresponding recesses 50 in the female coupling member. The exposed end portion of the male coupling member is of greater internal diameter than the hose and a pair of socketed supports 51 are mounted diametrically on the inner walls of the end portion adjacent its free end. Enlarged ends 52 of reinforcing cables 53 are seated within the sockets. Lugs 49 and recesses 50 on the respective coupling members are so positioned relative to supports 41 and 51 in the two members that when the members are secured together, supports 41 are aligned with supports 51.

In order to connect together the coupling members on a pair of adjacent hose sections, the male member is inserted into the female member and nut 48 is then screwed into the female member to cause the male member to seat against gasket 44. The nut is formed with a recess 54 in which the end of a spanner may be inserted for tightening the nut and the female member is formed with a similar recess 55. When the nut is screwed in tightly and the gasket compressed, a fluid-tight joint is formed between the coupling members. In producing such a joint, the two members do not rotate relative to one another but merely have a relative axial movement. The exposed end of nut 54 is protected by guard ring 46 against catching upon any obstruction, and the coupling is, consequently, streamlined and has a substantially smooth external surface.

The new hose is normally stored upon the deck of the tanker and, when the hose is to be used for the transfer of liquid, a recovery wire is attached to one of the links 34 on the inboard towing head, and a messenger wire is attached to one of the links 34 on the outboard towing head. At that time, the caps 25 close necks 24 on the respective heads, and air is introduced into the hose through the air valve in the outboard head. The messenger wire with floats attached to it is then paid out through a fairlead at the stern of the tanker and the inflated hose is similarly paid out. In due course, the escort vessel picks up the messenger wire and the wire is then passed through a fairlead 57 in the bow of the vessel and taken up by a capstan. When the end section of the hose is abroad the escort vessel, the free link 34 on the towing head is connected by suitable means to a deck pad eye. The hose is then deflated, and the caps 25 are removed and connections are made from the two towing heads to the bunkers of the escort vessel and the pumping equipment of the tanker, respectively. When the connection is to be made to the line leading to the bunkers, it may happen that the neck 24 on the towing head on the escort vessel is in an inconvenient location, and this may be corrected by backing off nut 31 and rotating the conical head member 23 to the desired extent, after which the nut is again tightened. When the desired amount of liquid has been transferred, the connections to the hose are broken and caps 25 are again used to close the ends of necks 24. The hose is inflated and the messenger wire and the connection to the pad eye on the escort vessel are released. The outboard end of the hose is then passed back through the fairlead on the escort vessel and the hose is drawn abroad the tanker.

Since, in the new hose, the reinforcing elements lie within the hose sections, the outside of the hose is smooth and has no projecting parts which may foul obstructions when the hose is being handled. The necks 24 on the conical parts of the towing heads are so placed and of such length that the caps 25 closing the necks lie substantially within the projected circumference of the hose, and the caps, therefore, do not project in such manner as to interfere with the handling of the hose. Similarly, the nut 48 of each coupling is streamlined by guard ring 46.

The force applied to the outboard towing head by the messenger wire to haul the end of the hose aboard the escort vessel is transmitted through the towing eye, rod 30, and bridge piece 21 to the reinforcing cables 35 in the outboard end section of the hose. These reinforcing cables are connected at their other ends to a coupling member and the forces applied to the cables are transmitted through the coupling to the reinforcing members of the next hose section and so on to the other end of the hose.

As previously explained, the male and female members of a coupling are kept from relative rotation by interfitting parts 49, 50, when the members are being connected together or disconnected. Instead, the members have a relative axial movement, while nut 48 rotates. This construction has a number of advantages and tends to prevent accidental disconnection of the coupling members when they are in use. Thus, the messenger cable is made of twisted wires so that a pull applied to the cable tends to untwist it and to twist the hose. Such action has no effect on the couplings and is merely transmitted from one member of a coupling to the other through parts 49, 50. Also, since only a small portion of nut 48 is exposed, external forces have little opportunity to act on the nut to back it off when the hose is in service.

The claims are:

1. A hose for transferring fluids, which comprises end sections and at least one intermediate section, each end section having a head at its outer end formed with an opening provided with a removable closure, coupling members on the inner ends of the end sections and both ends of the intermediate section, adjacent coupling members cooperating to form fluid-tight connections, and reinforcing means extending lengthwise of each section through the interior thereof, the means within each end section being connected to the head and to the coupling member on that section and the means within the intermediate section being connected to the coupling members thereon.

2. A hose for transferring fluids, which comprises end sections and at least one intermediate section, each end section having a head at its outer end, the head being formed of a pair of relatively rotatable parts and means for securing the parts together, coupling members on the inner ends of the end sections and both ends of the intermediate section, adjacent coupling members cooperating to form fluid-tight connections, and reinforcing means extending lengthwise of each section through the interior thereof, the means within each end section being connected to the head and to the coupling member on that section and the means within the intermediate section being connected to the coupling members thereon.

3. A hose for transferring fluids, which comprises end sections and at least one intermediate section, each end section having a head at its outer end, the head being formed of a pair of aligned relatively rotatable parts, one of which is formed with an opening provided with a removable closure, and means for securing the parts together, coupling members on the inner ends of the end sections and both ends of the intermediate section, adjacent coupling members cooperating to form fluid-tight connections, and reinforcing means extending lengthwise of each section through the interior thereof, the means within each end section being connected to the head and to the coupling member on that section and the means within the intermediate section being connected to the coupling members thereon.

4. A hose for transferring fluids, which comprises end sections and at least one intermediate section, each end section having a head at its outer end, the head being formed of a tubular member mounted on the end of the end hose section, a normally closed end member having an opening closed by a removable closure, and means for securing the members together, coupling members on the inner ends of the end sections and both ends of the intermediate section, adjacent coupling members cooperating to form fluid-tight connections, and reinforcing means extending lengthwise of each section through the interior thereof, the means within each end section being connected to the head and to the coupling member on that section and the means within the intermediate section being connected to the coupling members thereon.

5. A hose for transferring fluids, which comprises end sections and at least one intermediate section, each end section having a head at its outer end, the head being formed of a pair of parts and means engaging the parts and securing them together, said means projecting beyond the head and carrying connecting means, coupling members on the inner ends of the end sections and both ends of the intermediate section, adjacent coupling members cooperating to form fluid-tight connections, and reinforcing means extending lengthwise of each section through the interior thereof, the means within each end section being connected to the head and to the coupling member on that section and the means within the intermediate section being connected to the coupling members thereon.

6. A hose for transferring fluids, which comprises end sections and at least one intermediate section, each end section having a head at its outer end formed with an opening provided with a removable closure, coupling members on the inner ends of the end sections and both ends of the intermediate section, adjacent coupling members cooperating to form fluid-tight connections, and a pair of reinforcing elements extending lengthwise of each section within the interior thereof, the elements within each end section being connected at their ends to the head and the coupling member, respectively, and the elements within the intermediate section being connected to the coupling members on that section.

7. In a hose for transferring fluids, an end section having a coupling member on one end and a closed head on the other, the head having an opening provided with a removable closure, and reinforcing means extending lengthwise of the section within the interior thereof and connected to the coupling member and the head.

8. In a hose for transferring fluids, an end section having a coupling member on one end and a closed head on the other, the head having an opening provided with a removable closure, and a pair of reinforcing elements extending lengthwise of the section within the interior thereof and connected to the coupling member and the head, the connections of the elements to each of the coupling member and the head being diametrically disposed.

9. In a hose for transferring fluids, an end section having a coupling member on one end and a head on the other, the head being provided with an opening, a removable closure for the opening, and a spring-pressed air valve in the wall of the closure, and reinforcing means extending lengthwise of the section within the interior thereof and connected to the coupling member and the head.

10. In a hose for transferring fluids, an end section having a coupling member on one end and a head on the other, the member and head each having a portion entering the hose section and a portion projecting out of the section and of greater interior diameter than the section, socketed supports mounted on the inner walls of said projecting portions, and reinforcing elements extending through the section within the interior thereof and having enlarged ends seated in the sockets of the supports.

11. In a hose for transferring fluids, an end section having a coupling member on one end and a head on the other, the head including a tubular part mounted within the end of the section and protruding therefrom, an outer member engaging the exposed end of the tubular part, the member having an opening normally closed by a removable closure, and means engaging the parts and holding them together, and reinforcing means within the section extending lengthwise thereof and connected to the coupling member and the head.

12. In a hose for transferring fluids, an end section having a coupling member on one end and a head on the other, the head being formed of a pair of members mounted end to end, the outer member being rotatable relative to the inner one and having an opening closed by a removable closure, and means for securing the members together in aligned angular relation, and reinforcing means within the section extending lengthwise thereof and connected to the coupling member and the head.

13. In a hose for transferring fluids, an end section having a coupling member on one end and a head on the other, the head being formed of a pair of members mounted end to end, the outer member being rotatable relative to the inner one and having an opening closed by a removable closure, the inner member having an internal bridge piece, and means including a part attached to the bridge piece and extending through the outer member, for securing the members together, and reinforcing elements within the section extending lengthwise thereof and connected to the bridge piece and to the coupling member.

14. In a hose for transferring fluids, the combination of a pair of adjacent sections, a male coupling member mounted on the end of one section, a female coupling member mounted on the end of the other section and receiving the end of the male coupling member, means for securing the members together in alignment, and interfitting parts on the assembled members for positively holding them against relative angular movement.

15. In a hose for transferring fluids, a hose section, a coupling member having a tubular part within the end of the hose section and a second tubular part outside the hose section and of greater internal diameter than the hose section, a socketed support secured to the inner wall of the second tubular part, and a reinforcing element extending through the hose section and having an enlarged end seated in the socket in the support.

16. In a hose for transferring fluids, the combination of a pair of adjacent sections, a male coupling member mounted on the end of one section, a female coupling member mounted on the end of the other section and receiving the end of the male coupling member, a tubular nut threaded into the end of the female member and engaging a part of the male member, and interfitting parts on the members for positively holding them against relative angular movement.

ture above 1800° F., the amount of said powder intermingled with said methane being sufficient to heat said methane to a temperature above 1800° F., passing the resulting mixture through an elongated reaction zone, thereafter immediately discharging the suspension into the bottom portion of an enlarged zone wherein the velocity is reduced sufficiently to cause said powder to segregate into a relatively dense, fluid layer in the bottom portion of said zone, withdrawing reaction products from the upper portion of said enlarged zone and maintaining the temperature of said powder within said enlarged zone below 1000° F. to thereby rapidly cool said gaseous reaction products issuing from said elongated reaction zone.

5. In a process for high-temperature cracking of hydrocarbons wherein the hydrocarbons are cracked at a temperature upwards of 1800° F., the improvement which comprises intermingling highly heated refractory powder with a stream of said hydrocarbons to be cracked, the amount and temperature of said powder being sufficient to supply the heat required for the cracking process, passing a stream of said powder and hydrocarbons through a cracking zone maintained at a cracking temperature upwards of 1800° F. thereafter passing said stream upwardly through an enlarged zone at a reduced velocity controlled to cause said powder to separate into a relatively dense, turbulent layer within said enlarged zone, maintaining said relatively dense layer of powder within said enlarged zone at a temperature materially below said cracking temperature whereby the reaction products rising therethrough will be quenched to a temperature sufficient to avoid undesirable secondary reactions, continuously withdrawing a stream of said powder from said enlarged zone below the level of the dense phase, passing said stream through a heating zone, heating said powder within said heating zone to a temperature materially above said cracking temperature, thereafter remixing said heated powder with additional hydrocarbons to be cracked, withdrawing reaction products from the upper portion of said enlarged zone, and cooling the reaction products so withdrawn.

6. In a process for high-temperature cracking of hydrocarbons wherein the hydrocarbons are cracked at a temperature upwards of 1800° F., the improvement which comprises intermingling highly heated refractory powder with a stream of said hydrocarbons to be cracked, the amount and temperature of said powder being sufficient to supply the heat required for the cracking process, passing a stream of said powder and hydrocarbons through a cracking zone maintained at a cracking temperature upwards of 1800° F., thereafter passing said stream upwardly through an enlarged zone at a reduced velocity controlled to cause said powder to separate into a relatively dense, turbulent layer within said enlarged zone, continuously withdrawing a stream of said powder from said enlarged zone below the level of the dense phase, continuously cooling a portion of said stream of powder withdrawn from said enlarged zone and returning said cooled portion to said enlarged zone to maintain the temperature of the layer of powder therein materially below said reaction temperature, passing another portion of said stream through a heating zone, heating said powder within said heating zone to a temperature materially above said cracking temperature, thereafter remixing said heated powder with additional hydrocarbons to be cracked, withdrawing reaction products from the upper portion of said enlarged zone and cooling the reaction products so withdrawn.

7. In a process for high-temperature cracking of hydrocarbons wherein the hydrocarbons are cracked at a temperature upwards of 1800° F., the improvement which comprises intermingling highly heated refractory powder with a stream of said hydrocarbons to be cracked, the amount and temperature of said powder being sufficient to supply the heat required for the cracking process, passing a stream of said powder and hydrocarbons through a cracking zone maintained at a cracking temperature upwards of 180° F. thereafter passing said stream upwardly through an enlarged zone at a reduced velocity controlled to cause said powder to separate into a relatively dense, turbulent layer within said enlarged zone, maintaining said relatively dense layer of powder within said enlarged zone at a temperature materially below the range at which cracking of said hydrocarbons occurs, continuously withdrawing a stream of said powder from said enlarged zone below the level of the dense phase, passing said stream through a heating zone, heating said powder within said heating zone to a temperature materially above said cracking temperature, thereafter remixing said heated powder with additional hydrocarbons to be cracked, withdrawing reaction products from the upper portion of said enlarged zone, and cooling the reaction products so withdrawn.

EDWIN J. GOHR.

REFERENCES CITED

The following references are of record in the file of this patent:

UNITED STATES PATENTS

| Number | Name | Date |
|---|---|---|
| Re. 21,526 | Odell | Aug. 6, 1940 |
| 1,773,611 | Banck | Aug. 19, 1930 |
| 1,917,627 | Wulff | July 11, 1933 |
| 2,191,510 | Whitehurst | Feb. 27, 1940 |
| 2,253,486 | Belchetz | Aug. 19, 1941 |
| 2,303,047 | Hemminger | Nov. 24, 1942 |
| 2,337,684 | Scheineman | Dec. 28, 1943 |
| 2,356,697 | Rial | Aug. 22, 1944 |
| 2,358,888 | Thomas | Sept. 26, 1944 |
| 2,376,190 | Roetheli et al. | May 15, 1945 |
| 2,405,395 | Bahlke et al. | Aug. 6, 1946 |
| 2,407,371 | Jahnig | Sept. 10, 1946 |